(12) United States Patent
Li

(10) Patent No.: US 11,223,810 B2
(45) Date of Patent: Jan. 11, 2022

(54) COLOR BALANCE METHOD AND DEVICE, ON-BOARD EQUIPMENT AND STORAGE MEDIUM

(71) Applicant: Black Sesame International Holding Limited, Santa Clara, CA (US)

(72) Inventor: Wenxue Li, Wuhan (CN)

(73) Assignee: Black Sesame Technologies Inc., San Jose, CA (US)

( * ) Notice: Subject to any disclaimer, the term of this patent is extended or adjusted under 35 U.S.C. 154(b) by 0 days.

(21) Appl. No.: 17/061,559

(22) Filed: Oct. 1, 2020

(65) Prior Publication Data

US 2021/0144354 A1  May 13, 2021

(51) Int. Cl.

| | | |
|---|---|---|
| H04N 9/73 | (2006.01) | |
| H04N 9/04 | (2006.01) | |
| H04N 5/225 | (2006.01) | |
| H04N 5/247 | (2006.01) | |
| H04N 7/18 | (2006.01) | |

(52) U.S. Cl.
CPC ........... *H04N 9/735* (2013.01); *H04N 5/2253* (2013.01); *H04N 5/247* (2013.01); *H04N 7/18* (2013.01); *H04N 9/0451* (2018.08)

(58) Field of Classification Search
CPC ........ B60R 2300/101; B60R 2300/102; B60R 2300/105; B60R 2300/107; B60R 2300/303; B60R 2300/304; G06T 5/50; G06T 5/002; G06T 3/4038; H04N 5/23238; H04N 5/247; H04N 5/2253; H04N 9/735; H04N 9/0451; H04N 7/18
See application file for complete search history.

(56) References Cited

U.S. PATENT DOCUMENTS

| | | | | |
|---|---|---|---|---|
| 5,982,951 A | * | 11/1999 | Katayama | ............ H04N 1/3876 348/584 |
| 6,249,616 B1 | * | 6/2001 | Hashimoto | ............... G06T 7/35 345/427 |
| 6,393,162 B1 | * | 5/2002 | Higurashi | ............... G06T 5/006 345/629 |
| 6,813,391 B1 | * | 11/2004 | Uyttendaele | ............. G06K 9/03 345/629 |
| 6,943,829 B2 | * | 9/2005 | Endo | .................. H04N 5/23222 348/207.11 |
| 7,139,412 B2 | * | 11/2006 | Kato | ........................ B60R 1/00 382/104 |

(Continued)

*Primary Examiner* — Brian P Yenke
(74) *Attorney, Agent, or Firm* — Timothy T. Wang; Ni, Wang & Massand, PLLC

(57) ABSTRACT

The invention discloses a color balance method and device, an on-board equipment and a storage medium. The color balance method comprises the following steps of: acquiring a plurality of images of a plurality of regions in different directions around a vehicle from a plurality of cameras installed on the vehicle, wherein adjacent regions in the plurality of regions overlap each other; determining overlapping areas of the plurality of images based on overlapping areas of the adjacent regions; calculating an adjustment coefficient of the plurality of images on a color channel, and judging whether the adjustment coefficient is valid or not according to a preset threshold value; if the adjustment coefficient is invalid, setting the adjustment coefficient as a default value; and then adjusting the plurality of images according to the adjustment coefficient.

14 Claims, 5 Drawing Sheets

(56) References Cited

U.S. PATENT DOCUMENTS

| | | | |
|---|---|---|---|
| 7,239,805 B2* | 7/2007 | Uyttendaele | G06T 3/4038 348/218.1 |
| 7,269,281 B2* | 9/2007 | Anei | G06T 7/80 382/154 |
| 7,646,400 B2* | 1/2010 | Liow | G06T 3/4038 348/36 |
| 8,377,428 B2* | 2/2013 | Petersen | A61P 3/12 424/78.1 |
| 8,493,447 B2* | 7/2013 | Kaneko | G06T 11/60 348/148 |
| 8,774,495 B2* | 7/2014 | Murashita | G06T 11/60 382/154 |
| 8,902,313 B2* | 12/2014 | Rottner | H04N 5/23229 348/148 |
| 9,041,807 B2* | 5/2015 | Murakami | G06K 9/00812 348/148 |
| 9,838,614 B1* | 12/2017 | Brailovskiy | H04N 5/265 |
| 9,936,146 B2* | 4/2018 | Takami | H04N 9/04 |
| 10,009,551 B1* | 6/2018 | Adcock | H04N 5/265 |
| 10,341,557 B2* | 7/2019 | Chang | H04N 9/045 |
| 10,504,245 B2* | 12/2019 | Helwani | H04N 9/735 |
| 10,511,769 B2* | 12/2019 | Edpalm | H04N 5/2258 |
| 10,609,299 B1* | 3/2020 | Wang | H04N 5/247 |
| 10,742,896 B2* | 8/2020 | Takahashi | H04N 5/23229 |
| 10,764,496 B2* | 9/2020 | Chen | G06T 5/50 |
| 10,864,860 B2* | 12/2020 | Li | B60R 11/04 |
| 11,006,087 B2* | 5/2021 | Kokido | B60R 1/00 |
| 2006/0115182 A1* | 6/2006 | Deng | G06T 5/009 382/284 |
| 2009/0067742 A1* | 3/2009 | Lim | G06T 5/003 382/263 |
| 2009/0160931 A1* | 6/2009 | Pockett | H04N 13/25 348/42 |
| 2012/0062754 A1* | 3/2012 | Huang | H04N 5/2353 348/208.99 |
| 2012/0141014 A1* | 6/2012 | Lepikhin | G06T 5/009 382/154 |
| 2012/0189191 A1* | 7/2012 | Bai | H04N 13/133 382/154 |
| 2012/0249729 A1* | 10/2012 | Miyamoto | H04N 5/23238 348/36 |
| 2012/0293660 A1* | 11/2012 | Murakami | G06K 9/00812 348/148 |
| 2015/0254825 A1* | 9/2015 | Zhang | B60R 1/00 382/284 |
| 2017/0192733 A1* | 7/2017 | Huang | G06F 3/1446 |
| 2018/0098043 A1* | 4/2018 | Radakovic | H04N 5/247 |
| 2018/0139423 A1* | 5/2018 | Moule | H04N 9/3147 |
| 2018/0205889 A1* | 7/2018 | Abbas | H04N 5/265 |
| 2018/0278854 A1* | 9/2018 | Kottel | H04N 5/23238 |
| 2018/0316906 A1* | 11/2018 | Nobori | G06T 7/85 |
| 2019/0281215 A1* | 9/2019 | Chan | H04N 9/646 |
| 2019/0325580 A1* | 10/2019 | Lukac | G06T 7/12 |
| 2020/0043134 A1* | 2/2020 | Martin | G06T 7/32 |
| 2020/0329223 A1* | 10/2020 | Yeung | H04N 13/111 |

* cited by examiner

| A<br>Image adj. coef. of overlapping $F_i$ and $L_i$ cameras | Front $F_i$<br>Image adjustment coefficient of $F_i$ camera | B<br>Image adj. coef. of overlapping $F_i$ and $R_i$ cameras |
|---|---|---|
| Left $L_i$<br>Image adjustment coefficient of $L_i$ camera | Vehicle | Right $R_i$<br>Image adjustment coefficient of $R_i$ camera |
| D<br>Image adj. coef. of overlapping $B_i$ and $L_i$ cameras | Rear $B_i$<br>Image adjustment coefficient of $B_i$ camera | C<br>Image adj. coef. of overlapping $B_i$ and $R_i$ cameras |

Fig. 4

COLOR BALANCE METHOD AND DEVICE, ON-BOARD EQUIPMENT AND STORAGE MEDIUM

BACKGROUND

(1) Technical Field

The current disclosure relates to the technical field of vehicle panorama view, in particular to a color balance method and device, an on-board equipment and a storage medium.

(2) Background

In the application of vehicle panorama camera technology, images in different directions around the vehicle are acquired through a plurality of panoramic cameras installed on the vehicle. Generally, after obtaining the internal parameters/external parameters of the panoramic camera, data of four cameras is subjected to image transformation, and then the transformed images are mosaiced to obtain a panoramic image. However, due to differences in camera module consistency, sensors, CMOS, lens, installation location and environment and the like, the images of the same scene from different cameras have color differences, resulting in inconsistent colors in different areas of the mosaiced panoramic image. This will bring bad user experience. For example, it may affect users' judgment on road conditions around vehicles.

At present, the existing color adjustment technology for the mosaiced panoramic image is to uniformly expose the four cameras by a panorama controller, and a Soc performs processing cooperatively. A group of exposure parameters are obtained through a difference minimization operation in conjunction with the attenuation parameters in ISP of the camera module, and the exposure parameters are sent back to each camera ISP module. Each camera ISP module adjusts the exposure of the camera according to the exposure parameters, thereby using the four cameras with adjusted exposures to acquire images so as to reduce the color difference in overlapping areas of adjacent cameras in the panoramic image.

However, since the calculation of the above obtained exposure parameters only aims at minimizing the color difference of images acquired by different cameras in the overlapping area, the calculation result will sometimes produce large changes with respect to "1", resulting in over-adjustment to the original image of the camera. In addition, there may be a sudden change in the photographic environment of the camera module when the panoramic camera is operating, resulting in a large change in an adjustment parameter calculated for the current frame compared with the adjustment parameter calculated for the previous frame. The above two situations will lead to the "flicker" phenomenon of the mosaiced image, i.e. the brightness of the panoramic image will suddenly change when adjusting each frame image, thus resulting in that the image needs to be further processed.

SUMMARY OF THE INVENTION

To solve the above technical problems, the application provides a color balance method and device, an on-board equipment and a storage medium.

According to one aspect of the present application, it provides a color balance method comprising:

acquiring a plurality of images of a plurality of regions in different directions around the vehicle from a plurality of cameras installed on the vehicle, wherein adjacent regions in the plurality of regions overlap each other;

determining overlapping areas of the plurality of images based on overlapping areas of the adjacent regions;

calculating an adjustment coefficient of the plurality of images on a color channel, and judging whether the adjustment coefficient is valid or not based on a preset threshold value; if the adjustment coefficient is invalid, setting the adjustment coefficient as a default value; and then adjusting the plurality of images according to the adjustment coefficient.

In one embodiment, the step of calculating the adjustment coefficient of the plurality of images on the color channel comprises:

establishing an objective function, wherein the objective function comprises an average brightness value of pixel points of the image of the overlapping area on the color channel and the adjustment coefficient of the plurality of images on the color channel;

solving the objective function by using a least square method to obtain the adjustment coefficient of the plurality of images on the color channel.

In one embodiment, the objective function is:

$$f = \tfrac{1}{2}(F_i A_{F_i} - L_i A_{L_i})^2 + \tfrac{1}{2}(F_i B_{F_i} - R_i B_{R_i})^2 + \tfrac{1}{2}(R_i C_{R_i} - B_i C_{B_i})^2 + \tfrac{1}{2}(B_i D_{B_i} - L_i D_{L_i})^2$$

Wherein, $F_i$ represents an adjustment coefficient of an image captured by a front camera on an i channel; $R_i$ represents an adjustment coefficient of an image captured by a right camera on the i channel; $B_i$ represents an adjustment coefficient of an image captured by a rear camera on the i channel; $L_i$ represents an adjustment coefficient of an image captured by a left camera on the i channel; $A_{F_i}$ represents an average brightness value on the i channel of all pixel points in the image captured by the front camera in an overlapping area A; $A_{L_i}$ represents an average brightness value on the i channel of all pixel points in the image captured by the left camera in the overlapping area A; $B_{F_i}$ represents an average brightness value on the i channel of all pixel points in the image captured by the front camera in an overlapping area B; $B_{R_i}$ represents an average brightness value on the i channel of all pixel points in the image captured by the right camera in the overlapping area B; $C_{R_i}$ represents an average brightness value on the i channel of all pixel points in the image captured by the right camera in an overlapping area C; $C_{B_i}$ represents an average brightness value on the i channel of all pixel points in the image captured by the rear camera in the overlapping area C; $D_{B_i}$ represents an average brightness value on the i channel of all pixel points in the image captured by the rear camera in an overlapping area D; $D_{L_i}$ represents an average brightness value of all pixel points in the image captured by the left camera in the overlapping area D on the I channel; i channel is R channel, G channel or B channel.

In one embodiment, the step of judging whether the adjustment coefficient is valid or not according to the preset threshold value comprises:

establishing an adjustment coefficient change calculation formula;

substituting the calculated adjustment coefficient into the adjustment coefficient change calculation formula to calculate a first result, and calculating the standard deviation of the adjustment coefficients as a second result;

judging the adjustment coefficient is valid when the first result is less than or equal to a first preset threshold value and the second result is less than or equal to a second preset threshold value; otherwise, judging the adjustment coefficient is invalid, and setting the adjustment coefficient as the default value.

In one embodiment, the step of calculating the adjustment coefficient of the plurality of images on the color channel and judging whether the adjustment coefficient is valid or not according to the preset threshold value comprises calculating the adjustment coefficient of the plurality of images on the color channel every N frames and judging whether the adjustment coefficient is valid or not according to the preset threshold value, and setting the adjustment coefficient as the default value if it is invalid.

In one embodiment, the step of calculating the adjustment coefficient of the plurality of images on the color channel every N frames and judging whether the adjustment coefficient is valid or not according to the preset threshold value comprises:
recalculating an adjustment coefficient of a plurality of images of a current frame on the color channel every N frames using the formula (1-1), calculating the adjustment coefficient of the plurality of images of the current frame on the color channel by using a first-order filtering algorithm within N frames.

According to another aspect of the present application, it also provides a color balance device comprising:
an acquisition module configured to acquire a plurality of images of a plurality of regions in different directions around the vehicle from a plurality of cameras installed on the vehicle, wherein adjacent regions in the plurality of regions overlap each other;
a determination module configured to determine overlapping areas of the plurality of images based on overlapping areas of the adjacent regions;
a calculation module configured to calculate an adjustment coefficient of the plurality of images on a color channel;
a judgment module configured to judge whether the adjustment coefficient is valid or not according to a preset threshold value, and set the adjustment coefficient as a default value if the adjustment coefficient is invalid;
an adjustment module configured to adjust the plurality of images according to the adjustment coefficient.

In one embodiment, the calculation module is further configured to:
establish an objective function, wherein the objective function comprises an average brightness value of pixel points of the image in the overlapping area on the color channel and the adjustment coefficient of the plurality of images on the color channel;
solve the objective function by using a least square method to obtain the adjustment coefficient of the plurality of images on the color channel.

In one embodiment, the judgment module is further configured to:
establish an adjustment coefficient change calculation formula;
substitute the calculated adjustment coefficient into the adjustment coefficient change calculation formula to obtain a first result, and calculate the standard deviation of the adjustment coefficients as a second result;
judge the adjustment coefficient is valid when the first result is less than or equal to a first preset threshold value and the second result is less than or equal to a second preset threshold value; otherwise, judge the adjustment coefficient is invalid, and setting the adjustment coefficient as a default value.

In one embodiment, the calculation module is further configured to calculate the adjustment coefficient of the plurality of images on the color channel every N frames. The judgment module is also configured to judge whether the adjustment coefficient is valid or not according to the preset threshold value every N frames.

In one embodiment, the step of calculating the adjustment coefficient of the plurality of images on the color channel every N frames comprises:
Every N frames using the formula (1-1) recalculates an adjustment coefficient of a plurality of images of a current frame on the color channel, and determine whether the adjustment coefficient is valid according to the preset threshold; calculating the adjustment coefficient of the plurality of images of the current frame on the color channel by using a first-order filtering algorithm within N frames.

According to yet another aspect of the present application, it also provides an on-board equipment mounted on a vehicle, comprising a memory and a processor, wherein the memory stores processor executable instructions, wherein the executable instructions, in response to being executed by the processor, cause the on-board equipment to implement the steps of the method in the above aspect.

According to yet another aspect of the present application, it also provides a storage medium having stored thereon processor executable instructions, wherein the executable instructions, in response to being executed by the processor, cause an on-board equipment to implement the steps of the method in any of the above embodiments.

In the color balance method and device, the on-board equipment and the storage medium provided by the embodiment of the application, a plurality of images in different directions around the vehicle are acquired; overlapping areas of the plurality of images are determined; an adjustment coefficient of the plurality of images on a color channel is calculated and the adjustment coefficient is judged to be valid or not according to a preset threshold value; if it is not valid, the adjustment coefficient is set as a default value; the adjustment coefficient of the plurality of images on the color channel is calculated every N frames, and the adjustment coefficient of the plurality of images of the current frame on the color channel are calculated using a first-order filtering algorithm within N frames. The adjustment coefficient can be stably changed. Therefore, it can effectively solve the problem that the adjustment coefficient calculated for the current frame image has larger change compared with that for the previous frame due to sudden change in the module photosensitive environment during panoramic operation, thereby causing the mosaiced image to flicker in prior art. That is to say, it effectively solves the problem of sudden change of brightness in the panoramic image when adjusting each frame image.

DESCRIPTION OF THE DRAWINGS

FIG. 4 is a schematic diagram of adjustment coefficients of images acquired by cameras according to an embodiment of the present application.

DETAILED DESCRIPTION OF THE INVENTION

In order to make the purpose, technical scheme and advantages of the embodiments of the present application clearer, the technical scheme in the embodiments of the present application will be described clearly and completely below with reference to the drawings in the embodiments of the present application. Obviously, the described embodiments are part of the embodiments of the present application, not all of the embodiments. Based on the embodiments in this application, all other embodiments obtained by those of ordinary skill in the art without creative effort are within the scope of protection in this application.

As shown in this application and the claims, unless the context clearly indicates exceptions, the words "a," "an," and/or "the" do not refer specifically to the singular, but may also include the plural. In general, the terms "including" and "comprising" merely imply the inclusion of clearly identified steps and elements, which do not constitute an exclusive list, and a method or device may also include other steps or elements.

In addition, each of the embodiments described below has one or more technical features respectively, but this does not mean that it is necessary for the inventor to implement all the technical features in any one embodiment at the same time, or implement only some or all of the technical features in different embodiments separately. In other words, on the premise that implementation is possible, those skilled in the art can selectively implement some or all of the technical features in any embodiment or selectively implement a combination of some or all of the technical features in multiple embodiments according to the disclosure of the present invention and according to design specifications or actual requirements.

In order to make the object, technical scheme and advantages of this application clearer, the technical scheme in the embodiments of this application will be further explained in detail through the following embodiments and in conjunction with the drawings. It should be understood that the specific embodiments described herein are only for the purpose of explaining the present application and are not intended to limit the invention.

Figure 1:
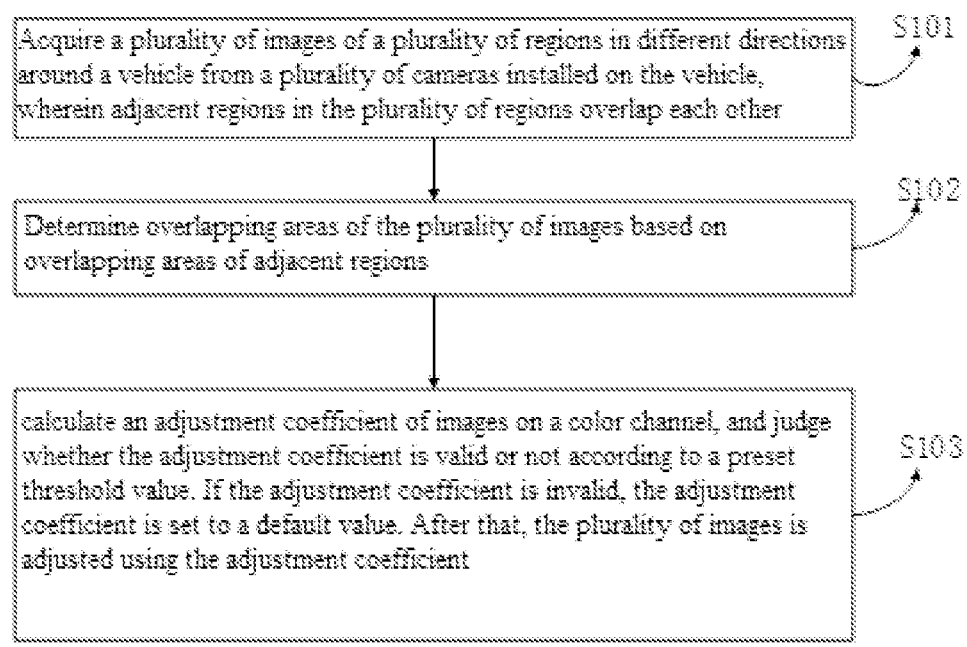
FIG. 1 is a flow chart of a color balance method according to an embodiment of the present application.

FIG. 1 provides a flow chart of a color balance method. In one embodiment, as shown in FIG. 1, the method includes the following steps.

S101: acquire a plurality of images of a plurality of regions in different directions around a vehicle from a plurality of cameras installed on the vehicle, wherein adjacent regions in the plurality of regions overlap each other.

In this embodiment, the acquired plurality of images may be images of the surroundings of the vehicle. The plurality of images may be images in various directions around the vehicle acquired by cameras installed on the vehicle. For example, each of four cameras installed on the vehicle acquires one image in each of the front, rear, left and right directions of the vehicle, and four images are acquired altogether.

Of course, more images in more directions can also be acquired according to actual needs. This application does not limit the number of directions and images.

S102: determine overlapping areas of the plurality of images based on overlapping areas of adjacent regions.

Figure 2:
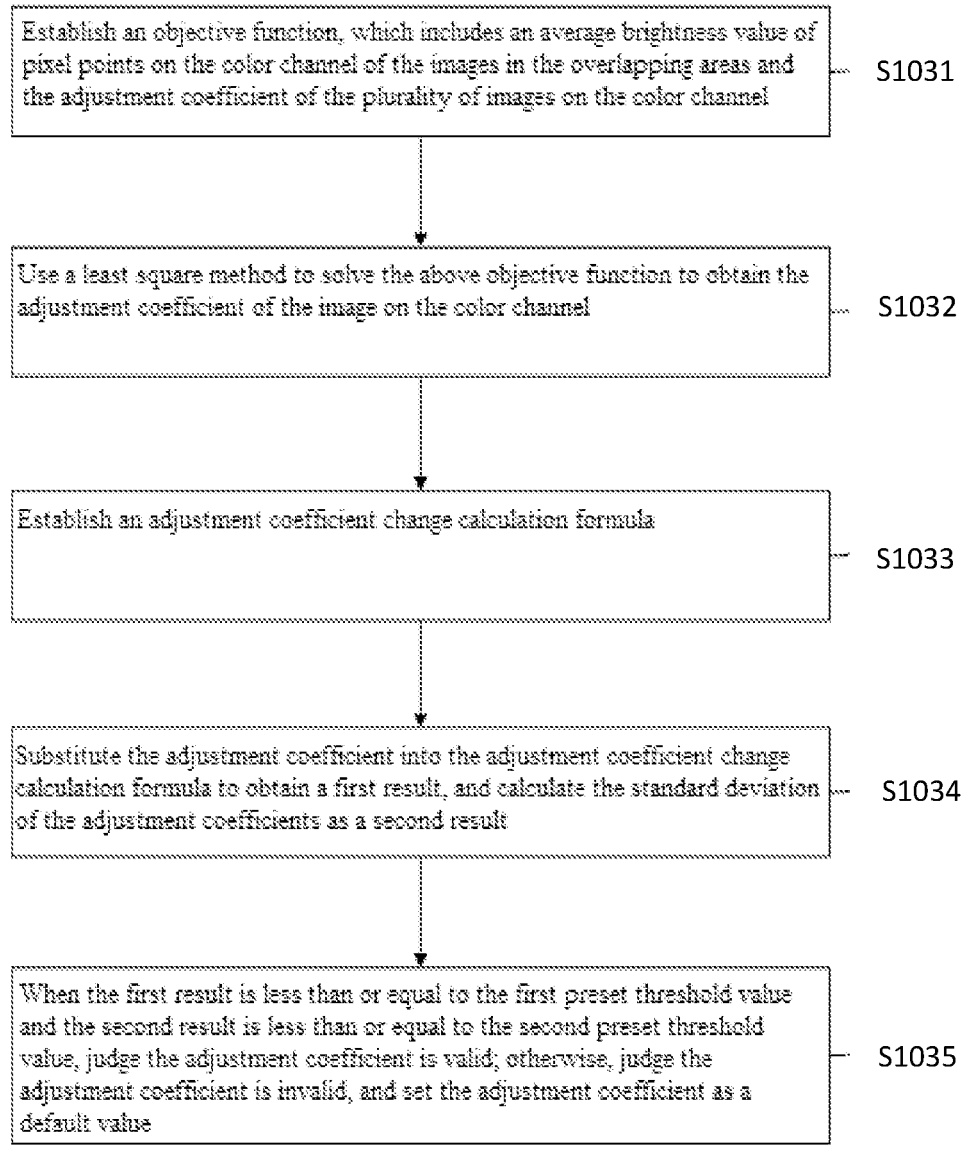
FIG. 2 is a flow chart of a color balance method according to another embodiment of the present application.

Specifically, referring to FIG. 4, internal parameters and external parameters of the four cameras are obtained through a calibration algorithm. The original images captured by the four cameras are subjected to distortion correction and perspective transformation according to the calibrated parameters, and then projected onto the ground to obtain four 2D images in the front, rear, left and right directions of the vehicle. These four 2D images can be mosaiced to form a 2D panoramic view of the vehicle, that is, a 2D bird's eye view of the vehicle. In this embodiment, the four cameras can be fisheye cameras in order to obtain a larger shooting range. However, since the angle of view of the fisheye camera is close to 180 degrees and the captured image is spherical, it is not convenient for the user to watch. Therefore, the above-mentioned processing needs to be first performed to convert the image into a 2D planar image convenient for the user to view so as to determine the overlapping area. For example, as shown in FIG. 2, the overlapping areas of these four images are A, B, C and D. The area A is an overlapping area between the image taken by the front camera and the image taken by the left camera. The area B is an overlapping area between the image taken by the front camera and the image taken by the right camera. The area C is an overlapping area between the image taken by the rear camera and the image taken by the right camera. The area D is an overlapping area between the image taken by the rear camera and the image taken by the left camera.

It should be noted that the above-mentioned internal parameters refer to parameters related to the camera's own characteristics, such as a focal length of the camera, an aspect ratio of the camera, distortion coefficient, pixel size, etc. The above external parameters refer to the parameters of the camera in the world coordinate system, including, for example, the camera's position, rotation direction, etc.

S103: calculate an adjustment coefficient of images on a color channel, and judge whether the adjustment coefficient is valid or not according to a preset threshold value. If the adjustment coefficient is invalid, the adjustment coefficient is set to a default value, for example, set it to "1". After that, the plurality of images is adjusted by using the adjustment coefficient.

Due to the continuity of the changes in the photosensitive environment of the panoramic operation in general, sudden changes only occur in a few cases (e.g. entering into an underground parking lot from outside, indoor lights on/off, etc.). However, the color correction needs to adjust the overall color of the panoramic image slowly, otherwise the color "dither" of the image will bring bad user experience. If the adjustment coefficient calculated according to the formula (1-1) is directly used for each frame image to adjust the image, the color "dither" will inevitably occur. Therefore, the validity of the calculated adjustment coefficient is judged according to the preset threshold value in the above steps. This can effectively solve the problem that the adjustment coefficient calculated for the current frame image has a large change with respect to "1" due to sudden change of the module's photosensitive environment during the panoramic operation, thereby causing the mosaiced image to flicker in prior art. That is to say, the present application effectively solves the problem of sudden change in brightness of the panoramic image when adjusting each frame image.

In this embodiment, the image has three color channels, namely, an R channel, a G channel and a B channel. Wherein, the R channel represents a red channel; the G channel represent a green channel; the B Channel represents a blue channel. Taking four cameras as an example, this step is to calculate the adjustment coefficients of the images captured by each camera of the four cameras on three color channels (RGB channels). Specifically, the adjustment coefficients ($F_r$, $F_g$, $F_b$) of the images captured by the front camera on RGB channels, the adjustment coefficients ($B_r$, $B_g$, $B_b$) of the images captured by the rear camera on RGB channels, the adjustment coefficients ($L_r$, $L_g$, $L_b$) of the images captured by the left camera on RGB channels, and the adjustment coefficients ($R_r$, $R_g$, $R_b$) of the images captured by the right camera on RGB channels are calculated respectively. The above calculation is carried out for each frame image, and the operating time on the target platform is generally within 10 ms.

In this embodiment, the adjustment coefficients of the four images from the four cameras on the RGB channels are respectively judged according to the preset threshold value.

If the adjustment coefficient calculated in the above step S103 is directly used to adjust the image, since the calculation result sometimes may have a large change with respect to "1", this may lead to over-adjustment to the original image captured by the camera. The judgement of the validity of the calculated adjustment coefficient can avoid the over-adjustment to the original image.

In another embodiment, as shown in FIG. 2, the step of calculating the adjustment coefficient of the image on the color channel in the above step S103 may include the following steps.

S1031: Establish an objective function, which includes an average brightness value of pixel points on the color channel of the images in the overlapping areas and the adjustment coefficient of the plurality of images on the color channel.

In this embodiment, taking four cameras as an example, the established objective function is as follows:

$$f = \tfrac{1}{2}(F_i A_{F_i} - L_i A_{L_i})^2 + \tfrac{1}{2}(F_i B_{F_i} - R_i B_{R_i})^2 + \tfrac{1}{2}(R_i C_{R_i} - B_i C_{B_i})^2 + \tfrac{1}{2}(B_i D_{B_i} - L_i D_{L_i})^2 \quad (1)$$

Wherein, $F_i$ represents an adjustment coefficient of an image captured by a front camera on an i channel; $R_i$ represents an adjustment coefficient of an image captured by a right camera on the i channel; $B_i$ represents an adjustment coefficient of an image captured by a rear camera on the i channel; $L_i$ represents an adjustment coefficient of an image captured by a left camera on the i channel; $A_{F_i}$ represents an average brightness value on the i channel of all pixel points in the image captured by the front camera in an overlapping area A; $A_{L_i}$ represents an average brightness value on the i channel of all pixel points in the image captured by the left camera in the overlapping area A; $B_{F_i}$ represents an average brightness value on the i channel of all pixel points in the image captured by the front camera in an overlapping area B; $B_{R_i}$ represents an average brightness value on the i channel of all pixel points in the image captured by the right camera in the overlapping area B; $C_{R_i}$ represents an average brightness value on the i channel of all pixel points in the image captured by the right camera in an overlapping area C; $C_{B_i}$ represents an average brightness value on the i channel of all pixel points in the image captured by the rear camera in the overlapping area C; $D_{B_i}$ represents an average brightness value on the i channel of all pixel points in the image captured by the rear camera in an overlapping area D; $D_{L_i}$ represents an average brightness value of all pixel points in the image captured by the left camera in the overlapping area D on the I channel; i channel is R channel, G channel or B channel.

In the above established objective function, the average brightness value of image pixel points on the color channel in the overlapping area is a known parameter; and the adjustment coefficient of the image on the color channel is an unknown parameter to be solved.

It should be noted that in order to speed up the calculation, when calculating the average brightness value of a camera on a certain channel in the overlapping area, instead of directly using all pixel points in the overlapping area, Gaussian downsampling is carried out on the overlapping area of the image to obtain a new image, and then subsequent calculation is carried out on all pixel points in the new image.

Specifically, the step of performing Gaussian downsampling on the overlapping area of the images to obtain a new image comprises the following steps of: selecting an appropriate Gaussian filtering radius r, generating a Gaussian weighting template with an edge length of 2*r+1, and performing Gaussian filtering on the overlapping area of the images by using the Gaussian weighting template with the edge length of 2*r+1; downsampling the image obtained by Gaussian filtering to obtain a new image. The above steps can reduce the influence of image noise on subsequent processing.

Further, the step of downsampling the image obtained by Gaussian filtering to obtain a new image includes determining the size of the downsampled new image; calculating the pixel value of each point in the downsampled new image to obtain a new image.

Further, determining the size of the downsampled new image includes setting the downsampling multiple to k, and setting the size of the downsampled new image to floor(M/k)*floor(N/k). Where the function floor(–) is a downward rounding function.

Further, the above calculating the pixel value of each point in the downsampled new image includes determining the pixel value of a point (x, y) in the downsampled new image as the pixel value of the point (k*x, k*y) in the image obtained by Gaussian filtering.

S1032: use a least square method to solve the above objective function to obtain the adjustment coefficient of the image on the color channel.

Specifically, the partial derivative of each adjustment coefficient is solved by the objective function to obtain several equations, and the equations are written in a form of a first matrix and a second matrix multiplied each other. Wherein the element of the first matrix include the average brightness value of image pixel points in the overlapping area on the color channel, and the element of the second matrix include the adjustment coefficient of the image on the color channel. Overdetermined equations are obtained by multiplying the first matrix and the second matrix and making their multiplication results to be zero. Each adjustment coefficient is obtained by solving the least square solution of the overdetermined equations.

The above process of solving the function using the least square method is a calculation method well known to those skilled in the art, and will not be repeated here.

In one embodiment, as shown in FIG. 2, the step of judging whether the adjustment coefficient is valid or not according to the preset threshold value in step S103 includes:

S1033: Establishing an adjustment coefficient change calculation formula;

S1034: Substituting the adjustment coefficient into the adjustment coefficient change calculation formula obtain a first result, and calculating the standard deviation of the adjustment coefficients as a second result;

S1035: When the first result is less than or equal to the first preset threshold value and the second result is less than or equal to the second preset threshold value, judging the adjustment coefficient is valid; otherwise, judging the adjustment coefficient is invalid, and setting the adjustment coefficient as a default value.

Specifically, taking the front camera of the four cameras as an example, the established adjustment coefficient change calculation formula is $d=(|F_r-1|+|F_g-1|+|F_b-1|)/3$. The calculated adjustment coefficients $F_r$, $F_g$, $F_b$ are substituted into the formula to calculate a change amount d; and the standard deviation of the adjustment coefficients $\{F_r, F_g, F_b\}$ is calculated. If the change amount d is less than or equal to the first preset threshold value and the standard deviation of the adjustment coefficients $\{F_r, F_g, F_b\}$ is less than or equal to the second preset threshold value, it can be judged that the adjustment coefficients $\{F_r, F_g, F_b\}$ are valid. Similarly, the adjustment coefficients of the images captured by the four cameras are sequentially processed as described above. When all the adjustment coefficients of the images captured by the four cameras are valid, it is judged that the adjustment coefficients calculated for the current frame image are valid adjustment coefficients. If not all adjustment coefficients of the images captured by the four cameras are valid, the adjustment coefficients of the images captured by each camera on each color channel are all reset to "1".

In another embodiment, the step of calculating the adjustment coefficient of the image on the color channel in step S103 and judging whether the adjustment coefficient is valid or not according to the preset threshold value may include calculating the adjustment coefficient of the image on the color channel every N frames and judging whether the adjustment coefficient is valid or not according to a preset threshold value.

Further, calculating the adjustment coefficient of the image on the color channel every N frames and judging whether the adjustment coefficient is valid or not according to the preset threshold value comprises: recalculating an adjustment coefficient of the current frame image on the color channel every N frames by using the formula (1-1); using a first-order filtering algorithm to calculate the adjustment coefficient of the current frame image on the color channel within N frames.

In this embodiment, the formula of the first-order filtering algorithm is:

$$Y(n)=aX(n)+(1-a)Y(n-1) \quad (1\text{-}2)$$

Wherein, Y(n) represents an output value of this filtering; a represents filter coefficient; Y(n−1) represents the last filtered output value; X(n) represents a current sampling value.

Specifically, taking the front camera of the four cameras as an example, one frame image at the current time is regarded as the first frame image, and the adjustment coefficients of the image captured by the front camera on the three color channels of R, G and B are calculated according to the calculation process of the above embodiment using the formula (1-1), and are recorded as $\{F_{r1}', F_{g1}', F_{b1}'\}$. $\{F_{r1}', F_{g1}', F_{b1}'\}$ is used to represent the last adjustment coefficient, since this is the first frame, set $F_r'=F_g'=F_b'=1$. The adjustment coefficients of the first frame to N-th frame on the color channel are obtained by the first-order filtering algorithm (1-2). For example, the adjustment coefficient of the first frame image from the front camera on the R channel is calculated according to equation (1-2) as $F_{r1}=(1-a)*F_r'+a*F_{r1}'$. Then, $F_r'$ is replaced with Fr1. The calculation of the adjustment coefficient of the second frame image on the R channel is continued, that is, the adjustment coefficient of the second frame image of the front camera on the R channel is $F_{r2}=(1-a)*F_{r1}+a*F_{r1}'$, and the calculation is continued, till the adjustment coefficient $F_{rN}$ of the Nth frame image on the R channel is calculated. Here, a series of adjustment coefficients $F_{r1}, F_{r2}, \ldots, F_{rN}$ on the R channel of the images from the first frame to the N-th frame obtained by the first-order filtering algorithm are gradually approaching $F_{r1}'$ from $F_r'$. The value of N can be determined according to the test results and can be 30 FPS. After the interval of N frames, the adjustment coefficient of the N+1th frame image is calculated again using the formula (1-1) according to the calculation process of the above embodiment, recorded as $\{F_{rN+1}', F_{gN+1}', F_{bN+1}'\}$. The adjustment coefficients of the N+1th frame to the 2*Nth frame image on the R channel are calculated according to the above process, and it is made to gradually approach $F_{rN+1}'$ from $F_{rN+1}$.

Through the above calculation process, the smooth change of the adjustment coefficients between frames can be realized. Due to the continuity of the changes in the photosensitive environment of the panoramic operation in general, sudden changes only occur in a few cases (e.g. entering into underground parking lot from outside, indoor lights on/off, etc.). However, the color correction needs to adjust the overall color of the panoramic image slowly, otherwise the color "dither" of the image will bring bad user experience. Panorama FPS is bout 25-30, that is, 25-30 panoramic images are generated within 1 s. If the adjustment coefficient calculated according to Formula (1-1) is directly used for each frame image to adjust the image, the color "dither" will inevitably occur. Therefore, the method of calculating the adjustment coefficient every N frames adopted here can make the adjustment coefficient change smoothly. Therefore, it can effectively solve the problem that the adjustment coefficient calculated for the current frame image has larger change compared with the previous frame when the module photosensitive environment changes suddenly during the panoramic operation, thus causing the mosaiced image to flicker in prior art. That is to say, the present application effectively solves the problem that the brightness of the panoramic image changes suddenly when each frame image is adjusted. In addition, the algorithm is not very complicated, and after adding the algorithm, the panoramic frame rate on the operating platform can still reach 30 FPS.

Figure 3:
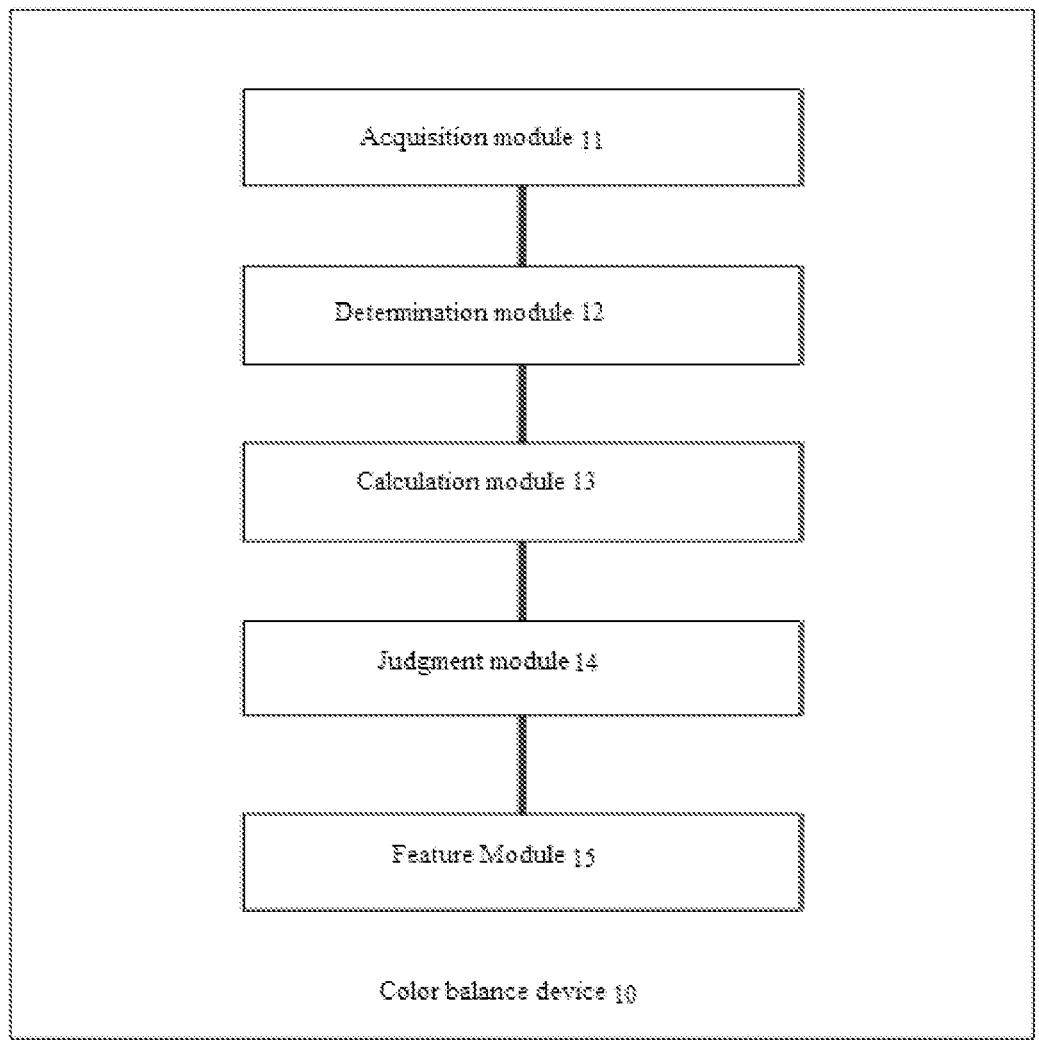
FIG. 3 is a schematic structural diagram of a color balance device according to an embodiment of the present application.
Figure 5:
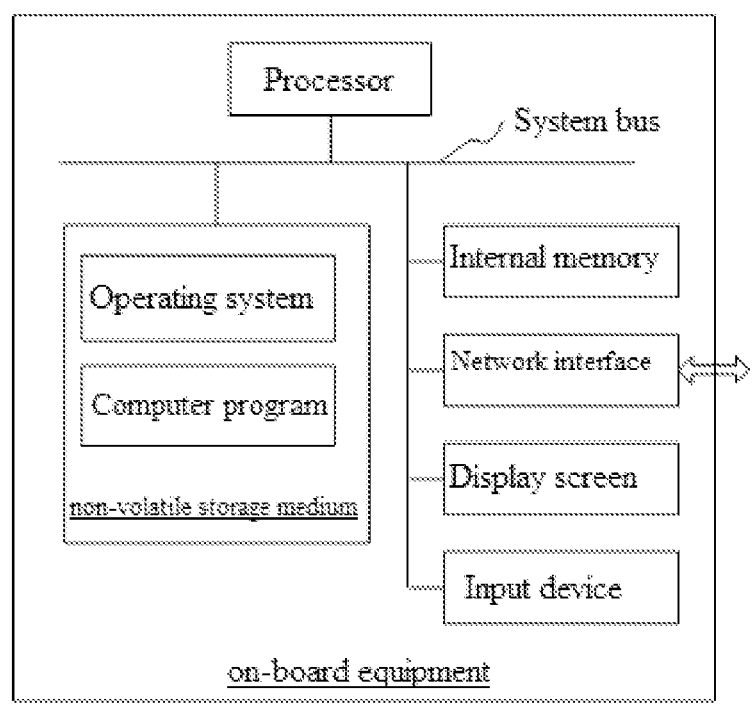
FIG. 5 is an internal structure diagram of an on-board equipment provided in one embodiment.

As shown in FIG. 3, an embodiment of the present application also provides a color balance device 10. The color balance device 10 comprises an acquisition module 11, a determination module 12, a calculation module 13, a judgment module 14 and an adjustment module 15.

Specifically, the acquisition module 11 is configured to acquire a plurality of images of a plurality of regions in different directions around a vehicle from a plurality of cameras installed on the vehicle, wherein adjacent regions in the plurality of regions overlap each other;

The determining module 12 is configured to determine overlapping areas of the plurality of images based on overlapping areas of adjacent regions;

The calculation module 13 is configured to calculate an adjustment coefficient of the plurality of images on a color channel;

The judgment module 14 is configured to judge whether the adjustment coefficient is valid or not according to a preset threshold value, and set the adjustment coefficient as a default value if the adjustment coefficient is invalid;

The adjustment module 15 is configured to adjust the plurality of images according to the adjustment coefficient;

In another embodiment, the calculation module 13 is further configured to establish an objective function including an average brightness value of image pixel points on the color channel in the overlapping area and the adjustment coefficient of the image on the color channel; use a least square method to solve the objective function to obtain the adjustment coefficient of the image on the color channel.

The judgment module 14 is further configured to: establish an adjustment coefficient change calculation formula; substitute the adjustment coefficient into the adjustment coefficient change calculation formula to obtain a first result, and calculate the standard deviation of the adjustment coefficients as a second result; judge the adjustment coefficient is valid when the first result is less than or equal to the first preset threshold value and the second result is less than or equal to the second preset threshold value; otherwise, judge the adjustment coefficient is invalid, and set the adjustment coefficients as a default value;

In another embodiment, the calculation module 13 is also configured to calculate the adjustment coefficient of the image on the color channel every N frames. The judgment module 14 is further configured to judge whether the adjustment coefficient is valid or not according to a preset threshold value every N frames.

In one embodiment, the application also provides an on-board equipment, which comprises a processor and a memory, wherein the memory stores a computer program, and the processor implements the following steps when executing the computer program:
acquiring a plurality of images of a plurality of regions in different directions around a vehicle from a plurality of cameras installed on the vehicle, wherein adjacent regions in the plurality of regions overlap each other;
determining overlapping areas of the plurality of images based on overlapping areas of the adjacent regions;
calculating an adjustment coefficient of the plurality of images on a color channel, and judging whether the adjustment coefficient is valid or not according to a preset threshold value; if the adjustment coefficients is invalid, setting the adjustment coefficient as a default value; and then adjusting the plurality of images according to the adjustment coefficient.

In one embodiment, the application also provides a storage medium on which a computer program is stored, and when executed by a processor, the computer program implements the following steps:
acquiring a plurality of images of a plurality of regions in different directions around a vehicle from a plurality of cameras installed on the vehicle, wherein adjacent regions in the plurality of regions overlap each other;
determining overlapping areas of the plurality of images based on overlapping areas of the adjacent regions;
calculating an adjustment coefficient of the plurality of images on a color channel, and judging whether the adjustment coefficient is valid or not according to a preset threshold value; if the adjustment coefficients is invalid, setting the adjustment coefficient as a default value; and then adjusting the plurality of images according to the adjustment coefficient.

One of ordinary skill in the art can understand that all or part of the flow process in the method for implementing the above embodiments which can be completed by instructing relevant hardware through a computer program, which can be stored in a non-volatile acquisition machine readable storage medium, and the computer program can include the process of the above embodiments when executed. Among them, any reference to memory, storage, database or other media used in various embodiments of the application may include non-volatile and/or volatile memory. The nonvolatile memory may include read only memory (ROM), programmable ROM (PROM), electrically programmable ROM (EPROM), electrically erasable programmable ROM (EEPROM), or flash memory. The volatile memory may include random access memory (RAM) or external cache memory. By way of illustration and not limitation, RAM is available in various forms, such as static RAM (SRAM), dynamic RAM (DRAM), synchronous DRAM (SDRAM), dual data rate SDRAM (DDRSDRAM), enhanced SDRAM (ESDRAM), synchronous link DRAM (SLDRAM), memory bus (Rambus) direct RAM (RDRAM), direct memory bus dynamic RAM (DRDRAM), and memory bus dynamic RAM (RDRAM), etc.

The above-mentioned examples only represent several embodiments of this application, and their descriptions are more specific and detailed, but they should not be construed as limiting the scope of this application. It should be pointed out that for those of ordinary skill in the art, several modifications and improvements can be made without departing from the concept of this application, which are all within the scope of protection of this application.

Therefore, the scope of protection of this patent application shall be subject to the appended claims.

What is claimed is:

1. A color balance method comprising:
acquiring a plurality of images of a plurality of regions in different directions around a vehicle from a plurality of cameras installed on the vehicle, wherein adjacent regions in the plurality of regions overlap each other;
determining overlapping areas of the plurality of images based on overlapping areas of the adjacent regions;
calculating an adjustment coefficient of the plurality of images on a color channel, and judging whether the adjustment coefficient is valid or not according to a preset threshold value; if the adjustment coefficient is invalid, setting the adjustment coefficient as a default value; and then adjusting the plurality of images according to the adjustment coefficient;
establishing an objective function, wherein the objective function comprises an average brightness value of pixel points of the image of the overlapping area on the color channel and the adjustment coefficient of the plurality of images on the color channel; and
solving the objective function by using a least square method to obtain the adjustment coefficient of the plurality of images on the color channel.

2. The objective function of claim 1 is:

$$f = \tfrac{1}{2}(F_i A_{F_i} - L_i A_{L_i})^2 + \tfrac{1}{2}(F_i B_{F_i} - R_i B_{R_i})^2 + \tfrac{1}{2}(R_i C_{R_i} - B_i C_{B_i})^2 + \tfrac{1}{2}(B_i D_{B_i} - L_i D_{L_i})^2$$

Wherein, $F_i$ represents an adjustment coefficient of an image captured by a front camera on an i channel; $R_i$ represents an adjustment coefficient of an image captured by a right camera on the i channel; $B_i$ represents an adjustment coefficient of an image captured by a rear camera on the i channel; $L_i$ represents an adjustment coefficient of an image captured by a left camera on the i channel; $A_{F_i}$ represents an average brightness value on the i channel of all pixel points in the image captured by the front camera in an overlapping area A; $A_{L_i}$ represents an average brightness value on the i channel of all pixel points in the image captured by the left camera in the overlapping area A; $B_{F_i}$ represents an average brightness value on the i channel of all pixel points in the image captured by the front camera in an overlapping area B; $B_{R_i}$ represents an average brightness value on the i channel of all pixel points in the image captured by the right camera in the overlapping area B; $C_{R_i}$ represents an average brightness value on the i channel of all pixel points in the image captured by the right camera in an overlapping area C; $C_{B_i}$ represents an average brightness value on the i channel of all pixel points in the image captured by the rear camera in the overlapping area C; $D_{B_i}$ represents an average brightness value on the i channel of all pixel points in the image captured by the rear camera in an overlapping area D; $D_{L_i}$ represents an average brightness value of all pixel points in the image captured by the left camera in the overlapping area D on the I channel; i channel is R channel, G channel or B channel.

3. The step to judge whether the adjustment coefficient is valid or not according to the preset threshold value of claim 1 further comprises:
   establishing an adjustment coefficient change calculation formula;
   substituting the calculated adjustment coefficient into the adjustment coefficient change calculation formula to calculate a first result, and calculating the standard deviation of the adjustment coefficients as a second result; and
   judging the adjustment coefficient is valid when the first result is less than or equal to a first preset threshold value and the second result is less than or equal to a second preset threshold value; otherwise, judging the adjustment coefficient is invalid, and setting the adjustment coefficient as the default value.

4. The step to judge whether the adjustment coefficient is valid or not according to a preset threshold value of claim 1 further comprises:
   calculating the adjustment coefficient of the plurality of images on the color channel every N frames and judging whether the adjustment coefficient is valid or not according to the preset threshold value.

5. The step to calculate the adjustment coefficient of the plurality of images on the color channel every N frames and judge whether the adjustment coefficient is valid or not according to the preset threshold value of claim 4 further comprises:
   recalculating the adjustment coefficient of the plurality of images of a current frame on the color channel every N frames by using the formula (1-1), and judging whether the adjustment coefficient is valid or not according to the preset threshold value, and setting the adjustment coefficient as the default value if the adjustment coefficient is invalid; calculating the adjustment coefficient of the plurality of images of the current frame on the color channel by using a first-order filtering algorithm within N frames.

6. A color balance device comprising:
   an acquisition module configured to acquire a plurality of images of a plurality of regions in different directions around the vehicle from a plurality of cameras installed on the vehicle, wherein adjacent regions in the plurality of regions overlap each other;
   a determination module configured to determine overlapping areas of the plurality of images based on overlapping areas of the adjacent regions;
   a calculation module configured to calculate an adjustment coefficient of the plurality of images on a color channel;
   a judgment module configured to judge whether the adjustment coefficient is valid or not according to a preset threshold value, and set the adjustment coefficient as a default value if the adjustment coefficient is invalid; and
   an adjustment module configured to adjust the plurality of images according to the adjustment coefficient;
   wherein the calculation module is further configured to establish an objective function, wherein the objective function comprises an average brightness value of pixel points of the image in the overlapping area on the color channel and the adjustment coefficient of the plurality of images on the color channel, and solve the objective function by using a least square method to obtain the adjustment coefficient of the plurality of images on the color channel.

7. The judgment module of claim 6 is further configured to:
   establish an adjustment coefficient change calculation formula;
   substitute the calculated adjustment coefficient into the adjustment coefficient change calculation formula to obtain a first result, and calculate the standard deviation of the adjustment coefficients as a second result; and
   judge the adjustment coefficient is valid when the first result is less than or equal to a first preset threshold value and the second result is less than or equal to a second preset threshold value; otherwise, judge the adjustment coefficient is invalid, and set the adjustment coefficient as a default value.

8. The calculation module of claim 6 is further configured to calculate the adjustment coefficient of the plurality of images on the color channel every N frames; the said judgment module is also configured to judge whether the adjustment coefficient is valid or not according to the preset threshold value every N frames.

9. The step of calculating the adjustment coefficient of the plurality of images on the color channel every N frames of claim 8 further comprises:
   recalculating an adjustment coefficient of a plurality of images of the current frame on the color channel every N frames by using the formula (1-1); calculating the adjustment coefficient of the plurality of images of the current frame on the color channel by using a first-order filtering algorithm within N frames.

10. An on-board equipment installed on a vehicle, comprising:
    a memory and a processor, wherein the memory stores processor executable instructions, wherein the executable instructions, in response to being executed by the processor, causes the on-board equipment to implement a color balance method comprising:
    acquiring a plurality of images of a plurality of regions in different directions around a vehicle from a plurality of cameras installed on the vehicle, wherein adjacent regions in the plurality of regions overlap each other;
    determining overlapping areas of the plurality of images based on overlapping areas of the adjacent regions; and
    calculating an adjustment coefficient of the plurality of images on a color channel, and judging whether the adjustment coefficient is valid or not according to a preset threshold value; if the adjustment coefficient is invalid, setting the adjustment coefficient as a default value; and then adjusting the plurality of images according to the adjustment coefficient;
    wherein the step to calculate the adjustment coefficient of the plurality of images on the color channel further comprises establishing an objective function, wherein the objective function comprises an average brightness value of pixel points of the image of the overlapping area on the color channel and the adjustment coefficient of the plurality of images on the color channel, and solving the objective function by using a least square method to obtain the adjustment coefficient of the plurality of images on the color channel.

11. The on-board equipment installed on a vehicle of claim 10 wherein the objective function is:

$$f = \tfrac{1}{2}(F_i A_{F_i} - L_i A_{L_i})^2 + \tfrac{1}{2}(F_i B_{F_i} - R_i B_{R_i})^2 + \tfrac{1}{2}(R_i C_{R_i} - B_i C_{B_i})^2 + \tfrac{1}{2}(B_i D_{B_i} - L_i D_{L_i})^2$$

Wherein, $F_i$ represents an adjustment coefficient of an image captured by a front camera on an i channel; $R_i$ represents an adjustment coefficient of an image captured by a right camera on the i channel; $B_i$ represents an adjustment coefficient of an image captured by a rear camera on the i channel; $L_i$ represents an adjustment coefficient of an image captured by a left camera on the i channel; $A_{F_i}$ represents an average brightness value on the i channel of all pixel points in the image captured by the front camera in an overlapping area A; $A_{L_i}$ represents an average brightness value on the i channel of all pixel points in the image captured by the left camera in the overlapping area A; $B_{F_i}$ represents an average brightness value on the i channel of all pixel points in the image captured by the front camera in an overlapping area B; $B_{R_i}$ represents an average brightness value on the i channel of all pixel points in the image captured by the right camera in the overlapping area B; $C_{R_i}$ represents an average brightness value on the i channel of all pixel points in the image captured by the right camera in an overlapping area C; $C_{B_i}$ represents an average brightness value on the i channel of all pixel points in the image captured by the rear camera in the overlapping area C; $D_{B_i}$ represents an average brightness value on the i channel of all pixel points in the image captured by the rear camera in an overlapping area D; $D_{L_i}$ represents an average brightness value of all pixel points in the image captured by the left camera in the overlapping area D on the I channel; i channel is R channel, G channel or B channel.

12. The on-board equipment installed on a vehicle of claim 10 wherein the step to judge whether the adjustment coefficient is valid or not according to the preset threshold value further comprises:
   establishing an adjustment coefficient change calculation formula;
   substituting the calculated adjustment coefficient into the adjustment coefficient change calculation formula to calculate a first result, and calculating the standard deviation of the adjustment coefficients as a second result; and
   judging the adjustment coefficient is valid when the first result is less than or equal to a first preset threshold value and the second result is less than or equal to a second preset threshold value; otherwise, judging the adjustment coefficient is invalid, and setting the adjustment coefficient as the default value.

13. The on-board equipment installed on a vehicle of claim 10 wherein the step to judge whether the adjustment coefficient is valid or not according to a preset threshold value further comprises:
   calculating the adjustment coefficient of the plurality of images on the color channel every N frames and judging whether the adjustment coefficient is valid or not according to the preset threshold value.

14. The on-board equipment installed on a vehicle of claim 13 wherein the step to calculate the adjustment coefficient of the plurality of images on the color channel every N frames and judge whether the adjustment coefficient is valid or not according to the preset threshold value further comprises:
   recalculating the adjustment coefficient of the plurality of images of a current frame on the color channel every N frames by using the formula (1-1), and judging whether the adjustment coefficient is valid or not according to the preset threshold value, and setting the adjustment coefficient as the default value if the adjustment coefficient is invalid; calculating the adjustment coefficient of the plurality of images of the current frame on the color channel by using a first-order filtering algorithm within N frames.

* * * * *